Dec. 20, 1966  R. H. PETERSON  3,292,754
OVERLOAD CLUTCH

Filed Sept. 3, 1964  2 Sheets-Sheet 1

Robert H. Peterson
INVENTOR.

Dec. 20, 1966                R. H. PETERSON                3,292,754
                              OVERLOAD CLUTCH
Filed Sept. 3, 1964                                    2 Sheets-Sheet 2

Robert H. Peterson
        INVENTOR.
BY

2

3,292,754
OVERLOAD CLUTCH
Robert H. Peterson, Woodbury Heights, N.J., assignor to the United States of America as represented by the Secretary of the Army
Filed Sept. 3, 1964, Ser. No. 394,368
3 Claims. (Cl. 192—56)

The invention described herein may be manufactured and used by or for the Government for governmental purposes without the payment of any royalty thereon.

The present invention relates to an overload clutch which is particularly well adapted for use in radar systems. To be satisfactory for service in a radar system an overload clutch must be capable of undergoing continuous overloads for long periods of time without damage to its components. It is further necessary that the overload may be very accurately preset. In conventional overload clutch systems friction elements are most commonly used. These elements are unsatisfactory in many cases since under continuous overloads the friction surfaces soon overheat. Also, an overheated friction element is incapable of being reset to the original overload specification without a complete readjustment of the clutch system. Existing overload clutches, in order to be completely unaffected by continuing overloads, generally become quite complex and expensive.

Accordingly one object of my invention is to provide an overload clutch having a preload adjustment which very accurately determines the overload required to disengage the clutch.

Another object of my invention is to provide a clutch which is capable of continued operation under overload conditions without damage to its components.

Still another object of my invention is to provide a dependable overload clutch which may be quickly and easily reset upon being overloaded.

Still another object of my invention is to provide a compact overload clutch which is simple to manufacture and relatively inexpensive.

Other features of my invention will become apparent in due course from the following description hereof with reference to the accompanying drawing given primarily by way of example and in which.

Figure 1:
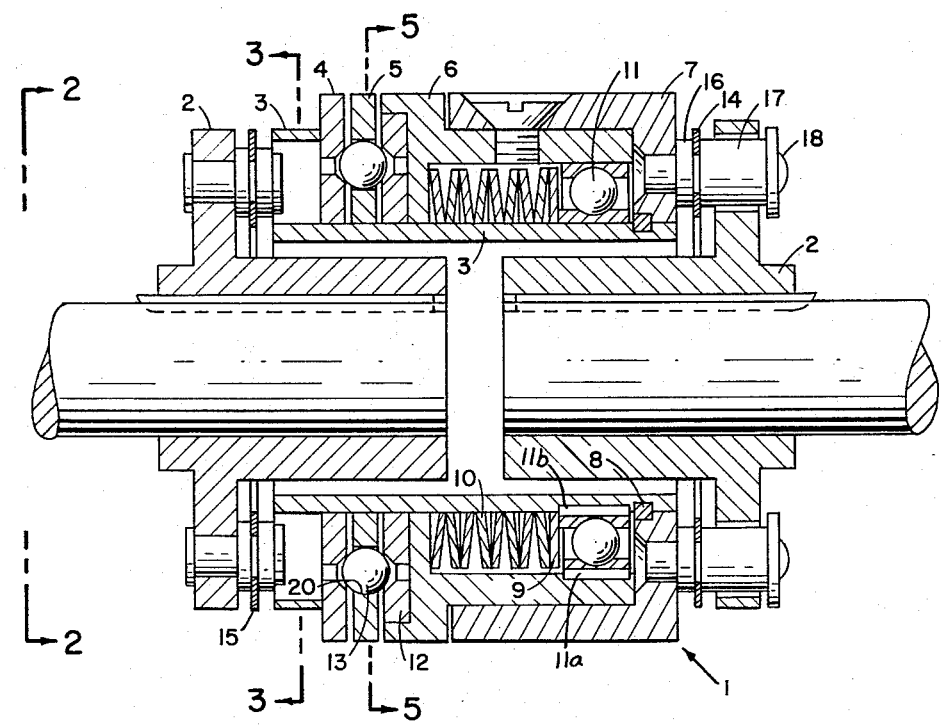
FIGURE 1 is a sectional view of my invention showing the relative arrangement of the components therein.

Referring now to FIGURE 1, a clutch engagement assembly 1 is attached intermediate a pair of hubs 2, either of which may be driving or driven. The clutch engagement assembly consists of an inner sleeve 3 which forms a cylinder surrounding the inner portions of each of the hubs and also serves to mount the majority of the components of the assembly. Rigidly attached to the inner sleeve is a thrust plate 4. Immediately adjacent the thrust plate is a ball retaining ring 5 followed by a housing 6 and a collar 7 each of which encircles sleeve 3. The radially outer surface of sleeve 3 is provided with a groove for reception of a retaining ring 8, which serves to maintain the inner portion of the engagement assembly in its proper lateral position and also serves as an actuator when the clutch becomes overloaded. The latter function of the retaining ring will be discussed in more detail hereinafter. A spacer 9 is located intermediate a series of Belleville springs 10 and the inner race of bearing 11 to provide freedom of rotation between the inner and outer races of bearing 11. Thus under an overload condition housing 6 is rotatable relative to inner sleeve 3 through ball bearing 11. The outer race of ball bearing 11 is movable axially along the inner cylindrical surface of housing 6, however, the race is keyed by key 11a to the housing to prevent relative rotation therebetween. The inner race of ball bearing 11 is keyed to sleeve 3 by key 11b to prevent relative rotation therebetween.

Figure 2:
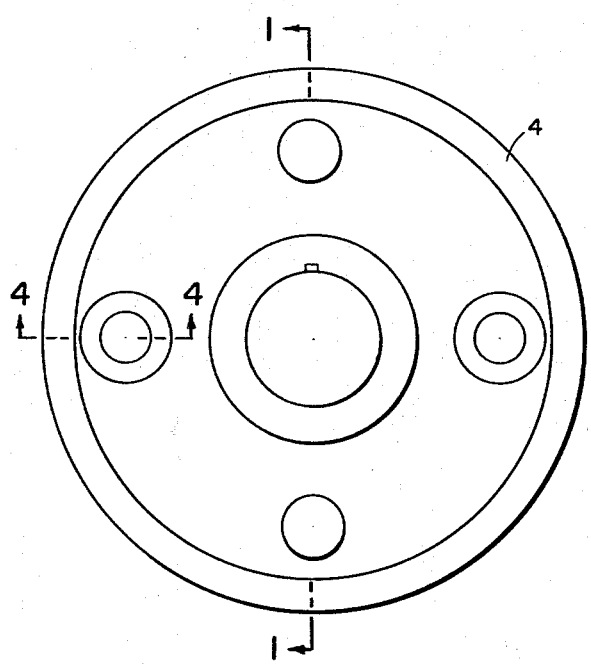
FIGURE 2 is an end view of my invention taken on lines 2—2 of FIGURE 1.
Figure 4:
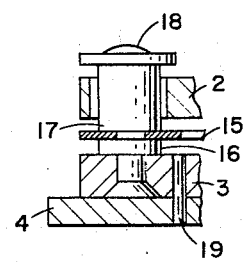
FIGURE 4 is a sectional view taken on lines 4—4 of FIGURE 2.
Figure 3:
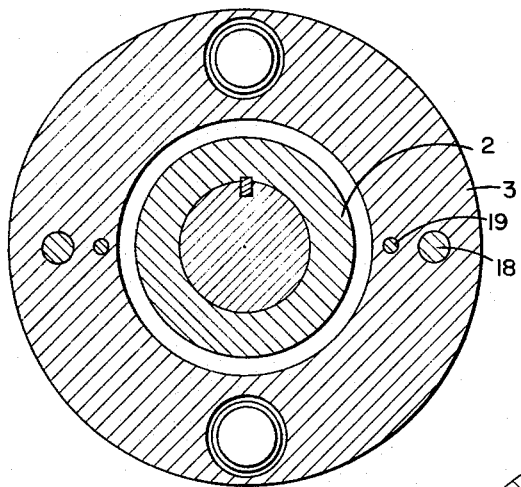
FIGURE 3 is a section taken on lines 3—3 of FIGURE 1.

A thrust plate 12 is attached to one lateral edge of housing 6. This thrust plate, as well as thrust plate 4, is provided with a plurality of detents for reception of balls 13. It is apparent from observation of FIGURES 1, 5 and 6 that ball retainer ring 5 is provided with a plurality of apertures for reception of balls 13. The clutch engagement assembly is attached to the hubs by means of flexible discs 14 and 15. Discs 14 and 15 are attached on radially opposite sides thereof to their respective hubs. As illustrated in FIGURES 2 through 4, the discs are attached to the clutch engagement assembly at points 90° rotated from the points at which they are attached to the hubs. It will be noted from examination of the opposite lateral ends of the device as illustrated in FIGURE 1, that the hub disc connections are laterally opposite, the assembly disc connections from one end of the device to the other.

FIGURE 4 illustrates in more detail the connection between the disc and inner sleeve 3. It will be noted that spacers 16 and 17 are squeezed by a rivet 18 to rigidly maintain disc 15 therebetween. Also, apparent from FIGURE 4 is the fact that inner sleeve 3 is free to move laterally relative to hub 2. Inner sleeve 3 is attached to thrust plate 4 by pins 19. The details of the connections between the discs and the hubs are clearly illustrated in FIGURE 1.

Figure 5:
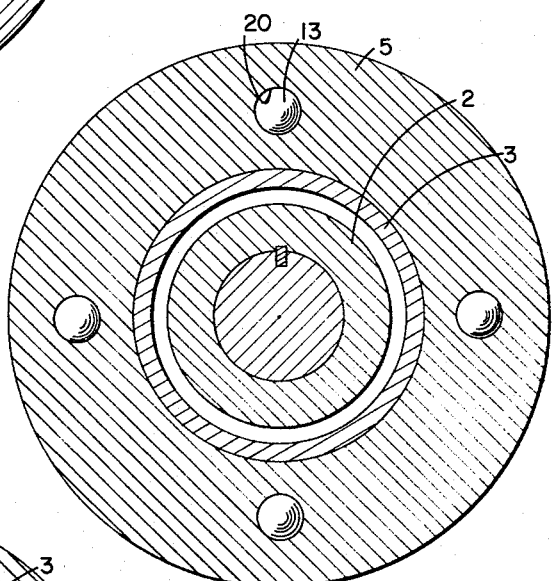
FIGURE 5 is a sectional view of a ball retaining ring taken on line 5—5 of FIGURE 1.
Figure 6:
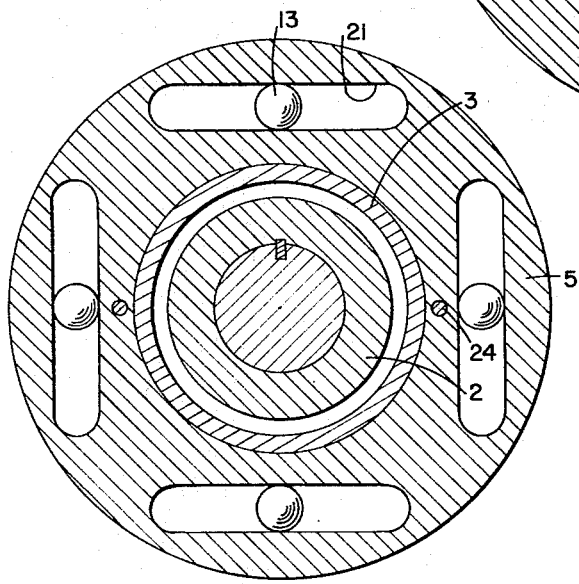
FIGURE 6 is a sectional view similar to FIGURE 5 illustrating a modification of the ball retaining ring.

FIGURE 5 illustrates the cross-sectional configuration of ball retaining ring 5, while FIGURE 6 is a similar view illustrating a modification of the device wherein the ball retaining ring is provided with a plurality of oblong apertures or slots 21 which are arranged tangent to the pitch circle of the ring and which take the place of apertures 20 in the configuration illustrated in FIGURE 5. When the modified ball retainer 5 is used it is fastened to one thrust plate 4 by means of pins 24 to provide cam action to move the balls to a radius outside the pitch circle of the detents.

In operation of the device, rotation of the left hub, for example, will cause rotation of inner sleeve 3 and the attached thrust plate 4 through flexible disc 15. The opposite hub being similarly attached by flexible disc 14 to collar 7 will rotate with the collar at all times. It will be noted that Belleville springs 10 react between the inner race of bearing 11 and the radially inner shoulder of housing 6, thus constraining thrust plate 12 in the direction of thrust plate 4, balls 13 being thereby rigidly maintained in their respective detents. Rotative force is thus transferred from one hub to the other through the interaction of thrust plates 4 and 12 with balls 13. Assuming an overload of the device, thrust plate 12 and housing 6 will be forced laterally away from thrust plate 4 by balls 13 which are rolled from their respective detents. This lateral movement of thrust plate 12 and housing 6 relative to thrust plate 4 will cause compression of Belleville springs 10 and relative axial movement between the outer race of bearing 11 and the inner cylindrical surface of housing 6. Assuming hubs 2 to be axially immovable on their respective shafts, flexible discs 14 and 15 will assist Belleville springs 10 in constraining the thrust plates toward one another. However, the spring force exerted by flexible discs 14 and 15 may be eliminated by allowing axial movement between hubs 2 and their shafts if desired. With the hubs axially fixed to their shafts it will be apparent that upon relative lateral movement of the thrust plates flexible discs 14 and 15 will be contorted on opposite radial edges thereof since their connection points between the hubs and the clutch assembly are radially rotated 90° from one another. In operation of the device when utilizing the modification illustrated in FIGURE 6, thrust balls 13 will be rotated not only out of their respective detents but will move radially outwardly to a radius out of the pitch circle of the detents. Thus, it will be apparent that balls 13 may travel on the smooth radially outer surfaces of thrust plates 4 and 12 without repeated reengagements with the detents as in the original embodiment. This modification is especially useful where it is desired that the hubs remain disconnected upon an initial overload. To reset the clutch using this modification, it is necessary only to reverse the rotational direction of the driving hub. Resetting may also be achieved manually by holding the thrust plates apart while the balls are relocated in their respective detents.

While the foregoing is a description of the preferred embodiments the following claims are intended to include those modifications and variations that are within the spirit and scope of my invention.

I claim:

1. An overload clutch comprising a driving hub, a driven hub, an annular flexible disc, means connecting radially opposite portions of said disc to said driving hub, an inner sleeve, means connecting radially opposite portions of said disc to said inner sleeve, said means connecting the disc to the inner sleeve being located radially 90° from said hub connecting means, spacer means for maintaining a clearance between said disc and said hub, second spacer means for maintaining a clearance between said disc and said inner sleeve, relieved portions within said inner sleeve for reception of said hub connecting means, relieved portions within said hub for reception of said inner sleeve connecting means whereby said inner sleeve and said hub are axially movable relative to one another, a thrust plate rigidly attached to said inner sleeve, said thrust plate having a plurality of detents formed in one surface thereof, a housing surrounding a portion of said inner sleeve, a second thrust plate attached to said housing, said second thrust plate having a plurality of detents in one face thereof, the detents in each of said thrust plates being radially aligned and oppositely located, a plurality of balls located between said thrust plates intermediate said detents, a ball retaining ring intermediate said thrust plates and surrounding said inner sleeve, said retaining ring having a plurality of apertures, said apertures receving and maintaining said balls intermediate said thrust plates, a ball bearing having an inner and an outer race, said bearing surrounding said inner sleeve, the inner race of said ball bearing being nonrotatably attached to the outer surface of said inner sleeve the outer race of said ball bearing being non-rotatably attached to the inner surface of said housing, means for limiting the lateral movement of said inner race on said inner sleeve, spring means acting between said housing and the inner race of said bearing, said spring means maintaining said inner sleeve against said limiting means, a flexible disc surrounding said driven hub, means connecting radially opposite portions of said flexible disc to said hub, means for connecting said flexible disc to said housing, said last mentioned connecting means being radially spaced 90° relative to said hub connection means and spacer means for maintaining a clearance between said housing and said hub whereby said housing may be axially moved relative to said driven hub upon movement of said balls from their respective detents.

2. An overload clutch comprising a driving hub, a driven hub, an engagement assembly, and resilient means attaching said hubs to laterally opposite end portions of said assembly, said hubs and said assembly being arranged coaxially relative to each other, the end portions of said assembly being axially movable relative to said hubs, said assembly comprising an inner sleeve, a thrust plate rigidly attached to said inner sleeve, a collar surrounding said inner sleeve, a thrust plate attached to said collar, a plurality of detents in one surface of each of said thrust plates, said detents being radially and circumferentially aligned with one another in face to face relation, a ball located intermediate said plates in each of said detents, a ball retaining ring intermediate said plates, said ring being adapted for retention of each of said balls, bearing means intermediate said inner sleeve and said collar and spring means for maintaining said inner sleeve and collar in their laterally extended position.

3. A device as set forth in claim 2, wherein the apertures in said ball retaining ring are oblong and angularly arranged so as to guide said balls radially outside the detents formed in said thrust plates upon relative rotation between said thrust plates.

References Cited by the Examiner

UNITED STATES PATENTS

| 2,846,856 | 8/1958 | Hagenlocker | 64—13 |
| 2,883,839 | 4/1959 | Troeger et al. | 64—13 |
| 3,062,025 | 11/1962 | Bostow et al. | 64—13 |
| 3,095,955 | 7/1963 | Orwin | 192—56 |
| 3,185,275 | 5/1965 | Orwin | 192—56 |

FOREIGN PATENTS 796,845   2/1936   France.

DAVID J. WILLIAMOWSKY, *Primary Examiner.*